Oct. 14, 1952     T. S. WEST     2,613,747
WELL TESTER
Filed July 28, 1947     4 Sheets-Sheet 1
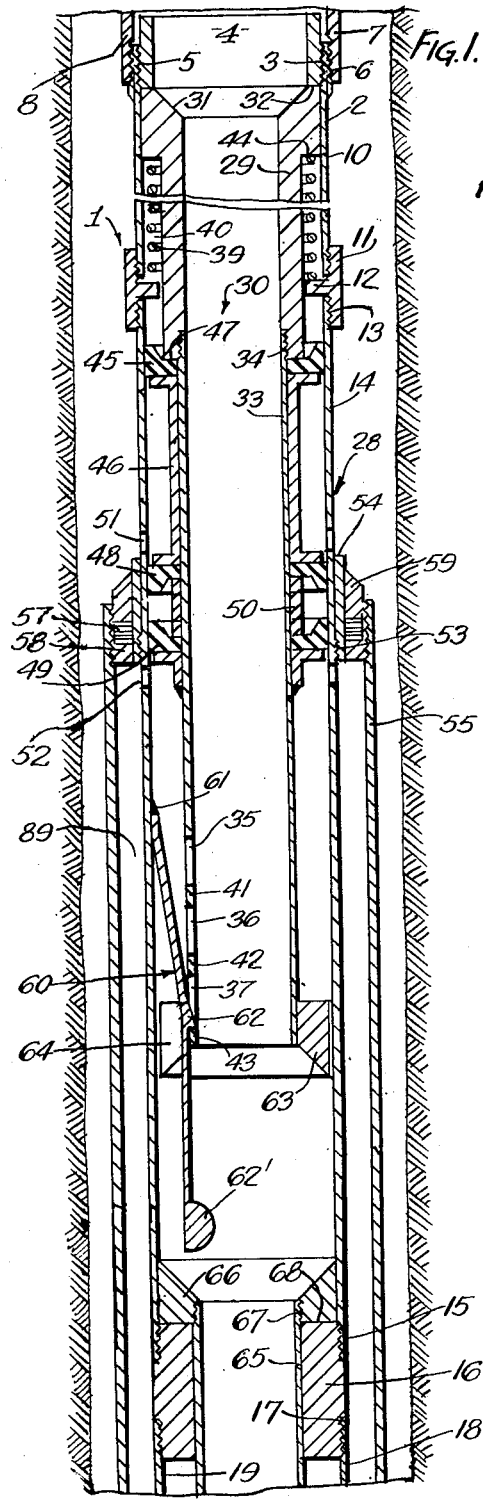
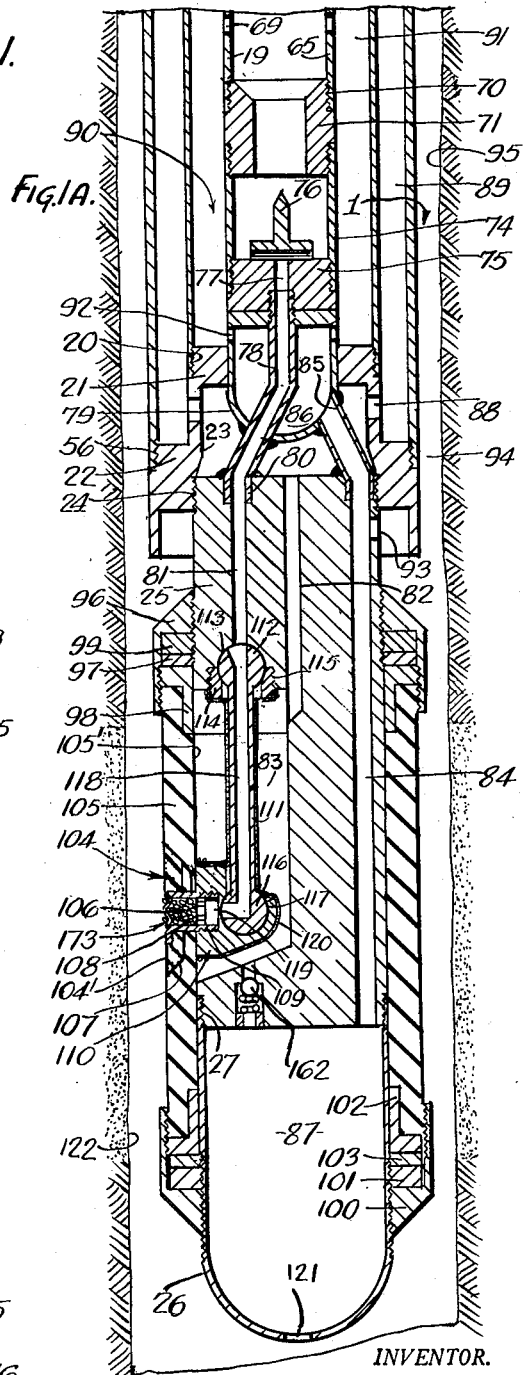
INVENTOR.
Thomas S. West

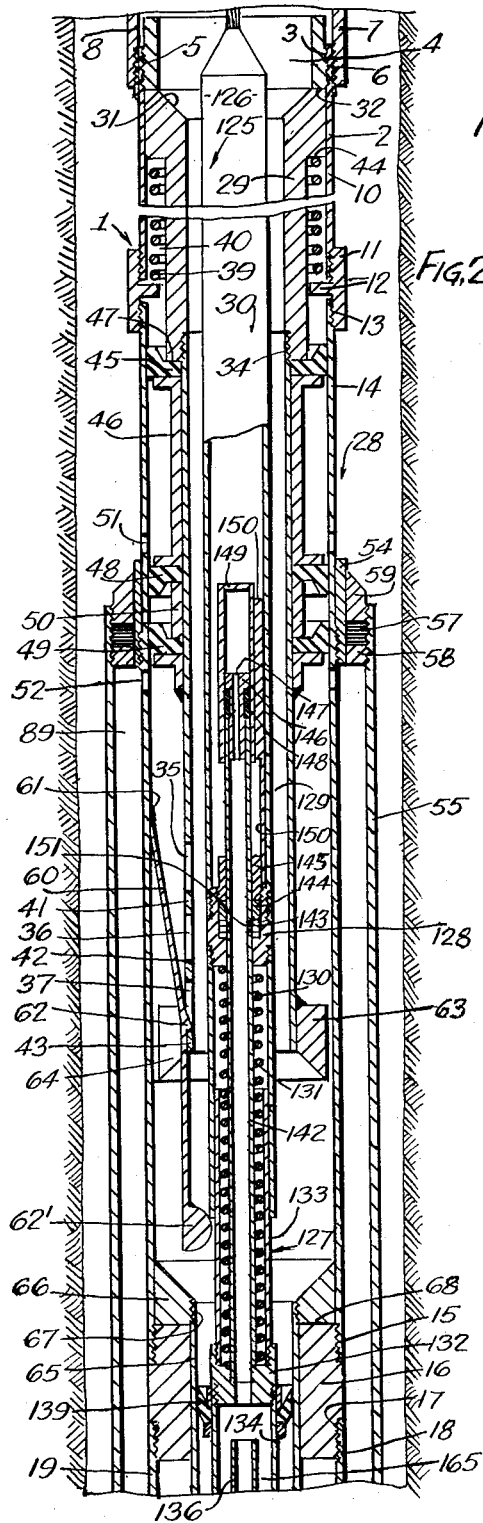

Oct. 14, 1952 T. S. WEST 2,613,747
WELL TESTER
Filed July 28, 1947 4 Sheets-Sheet 3

INVENTOR,
Thomas S. West

Oct. 14, 1952 — T. S. WEST — 2,613,747
WELL TESTER
Filed July 28, 1947 — 4 Sheets-Sheet 4

INVENTOR.
Thomas S. West

Patented Oct. 14, 1952

2,613,747

UNITED STATES PATENT OFFICE 2,613,747

WELL TESTER

Thomas Scott West, San Antonio, Tex.

Application July 28, 1947, Serial No. 764,123

7 Claims. (Cl. 166—1)

This invention relates to the determination of the fluid productivity of the formations comprising the wall of an uncased well.

The primary object of this invention is to provide a positive means for determining the fluid productivity at any level in a well after it has been drilled to the desired depth. This information is of great economic value for determining the desirability of setting casing. At present the productivity of the formations penetrated may be reliably determined for the bottom portion of the hole only. This necessitates considerable coring as a guide for selecting the zones to be tested.

For example, in penetrating a thick sand section containing segregated gas, oil, and water zones, it may be necessary to alternately core and then drill stem test relatively small intervals such as five feet or less. Not only is this operation expensive but frequently drill stem tests are not taken at the proper level for accurate determination of gas, oil and water levels because of failure to core at the proper point, or because of failure to recover the core after it has been cut. Frequently the existence of possible productive formations are not discovered until after the well has been drilled to some lower level. At present the casing has to be set before the productivity of a porous formation when such formation has been indicated by an electric log, can be determined. Although study and analysis of side wall, or other cores, yield some information as to the probable fluid which will be produced, such determinations are frequently erroneous, and often result in expensive attempts at completion in zones which prove to be nonproductive of oil or gas.

This invention is designed to provide a tool sufficiently positive in operation as to render unnecessary coring and productivity tests prior to drilling the well to the desired total depth. The elimination of such coring and testing operations significantly decreases the cost of drilling wells, particularly that of wildcat or exploratory wells.

Although a number of side wall fluid sampling devices have been proposed, these devices have not proved sufficiently positive in operation to replace usual testing and coring procedures. The development of a high degree of efficiency is therefore critical. Present side wall testing devices fail to yield sufficiently positive results as to make possible the elimination of present coring and testing practices because of one or more of the following difficulties:

The existence of a large and irregular hole due to caving, or because of mechanical abrasion associated with the drilling operation;

Plugging of fluid inlets of the testing device by unconsolidated sand, or by a mixture of sand or other material comprising the wall of the well, with drilling mud;

Sticking of the device because of inflow of unconsolidated sand or similar formation. Devices employing spaced apart packers are particularly susceptible to sticking in this way, frequently resulting in an expensive "fishing job," or in a "junked hole."

This invention avoids the critical weaknesses hereinabove listed and consequently provides an operative testing device competent to adequately eliminate present coring and testing procedure, thereby obtaining a novel and beneficial result which the oil producing trade has long awaited.

Other and further objects of this invention will be apparent when the specification is considered in connection with the drawings in which:

Fig. 1 is a sectional elevation of the upper part of the tool installed in a pipe string.

Fig. 1–A is a sectional elevation of the lower end of the tool, upper end of which is shown in Fig. 1.

Fig. 2 is a sectional elevation of the upper end of the tool with the sampling tube inserted.

Fig. 2–A is a sectional elevation of the lower end of the tool, showing the sampling tube seated, and the packer expanded.

Figure 4:
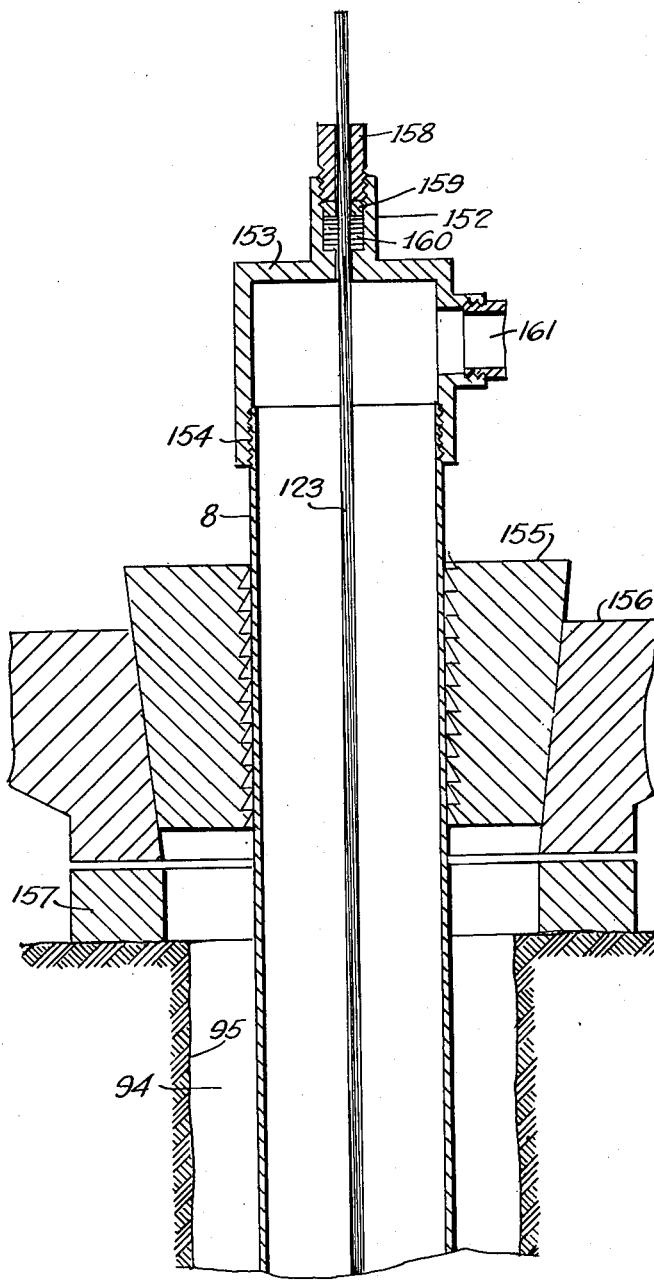
Fig. 4 is an enlarged fragmentary view of the structures at the top of the well which permit the carrying out of the functions of this invention.

As shown in Fig. 1, the tool 1 has the housing pipe 2 which is internally threaded at 3 to receive the hold-down or stop collar 4. The collar 5 is connected externally, as by welding, to the top of the housing pipe 2 and is externally threaded at 6 for engagement with the internally threaded lower end 7 of a string of drill pipe 8.

The housing pipe 2 has the externally threaded lower end 10 for engagement with the nipple 11 which has the internally projecting radial flange 12 and which is threaded internally at 13 to receive the externally threaded upper end of the housing pipe 14. At its lower end the housing pipe 14 is internally threaded at 15 for engagement with the connector 16. The connector 16 is externally threaded at 17 for engagement with the internally threaded upper end 18 of the housing pipe 19.

As shown in Fig. 1–A, the housing pipe 19 is internally threaded at 20 for connection to the turned down, externally threaded upper end 21 of the closure member 22. The bore 23 of the closure member 22 is threaded at 24 for engagement with the mandrel 25. The mandrel 25 has as a part thereof the plug 26 which is internally threaded at 27 for engagement therewith.

A mandrel assembly 20 is slidably operable within the housing or housing assembly 28. The upper mandrel element 29 of this assembly has the countersunk seat 31 therein, and outwardly thereof shoulders at 32 against the stop collar 4. The lower mandrel section 33 is threaded at 34 into the upper section 29 and has the slots 35, 36, and 37 in the lower end thereof so that the wall sections therein constitute the catches 41, 42, and 43 for purposes to be hereinafter described. The lower mandrel section also has welded therearound the angle iron flange 38.

The spring 39 is confined within the annular space 40 between mandrel 30 and housing 28 and bears upon the flange 12 to urge upwardly against the mandrel shoulder 44 to force the mandrel against the stop collar 4. A flexible, cup type packer member 45 is confined around the mandrel section 33 between the spool member 46 and the lower end face 47 of the upper mandrel element 29. Similar packer members 48 and 49, separated by the spacer ring 50, extend around the section 33 and are confined between the spool member 46 and the flange 38. As shown in Fig. 1 the housing has the ports 51 therein between the cups 45 and 49, and the ports 52 therein below the cup 48.

The housing 28 has the externally threaded portion 53 thereon for engagement with the collar 54. The pipe or jacket 55 is internally threaded at 56 for engagement with the closure member 22 and upstands thereabove, and is internally threaded at 57 to receive therein the lower ring 58 and the bevel ring 59 which rings surround the collar 54.

A latching device 60 is fixed at 61 to the bore of the housing 28 and has the wedge or prong member 62 thereon for engagement with the catches 41, 42, and 43, and extends downwardly to terminate in the trigger member 62'. To accommodate the latching device 60, the countersunken ring 63, around the end of the mandrel section 33, has the slot 64 therein through which the latching device 60 operates.

The pipe or tube 65 extends through the connector 16 and has the guide ring 66 threaded thereonto at 67 to bear on the top face 68 of the connector. The tube 65 has the ports 69 therein and is connected at 70 to the seat element 71. The tube 72 is connected at 73 to the seat element 71 and terminates at its threaded connection 74 with the valve seat plug 75. The valve 76, which is indicated partly diagrammatically, covers the passage 77 through the plug 75, and the pipe or tubular element 78 is connected into the base of the plug to extend the passage downwardly.

The tubular element 78 has therearound, and connected thereto, the manifold plug 79 which supports the plug 75 thereabove, and which has therearound the upper end 21 of the closure member 22. The tubular element 78 extends below the manifold plug 79 and connects into the mandrel 25 at 80, thereby extending the passage 77 into communication with the axially extending passage 81 in the mandrel 25.

The mandrel 25 also has therein the axially extending passage 82 which extends from the top thereof downwardly to communicate with the open space 83 therein. It also has the axially extending passage 84 which connects with the tubular element 85 which connects the interior of the manifold plug 79 with the mandrel. In this way communication is established between the manifold plug interior 86 and the interior 87 of the plug 26.

The ports 88 in the upper end 21 of the closure member 22 place the annular space 89 between jacket 55 and housing 28 in communication, via the bore 23 and passageway 82, with the plug space 87. Also, the ports 92 place the annular space 91 between housing pipe 19 and tubular assembly 90 in communication, via the space 86 and the passageway 84, with the space 87. The port 93, in turn, places the passageway 84 in communication with the annular space 94 between the tool 1 and the well bore 95. The port 121 places the space 87 within the plug 26 in communication with the annulus 94.

Fluidtight connectors 96 and 97 are threaded onto the mandrel 25, and the connector 96 is threaded internally to receive the flanged holddown ring 98 which bears against the fluidtight connector 99. A similar arrangement of fluidtight connectors 100 and 101 are threaded onto the plug 26, the connector 100 being internally threaded to receive the flanged support ring 102 which bears against the fluidtight connector 103.

Between the fluidtight connector 96 and holddown ring 98 above, and the fluidtight connector 100 and support ring 102 below, there is installed the sleeve type packer 105, in fluidtight sealed relationship with these elements. A flexible screen assembly 104, including a flexible pad 104', is fitted in a recess 107 in the packer 105, and surrounds and has passing centrally therethrough a fluid inlet member 108, having a mesh screen 173 over the face of such inlet to retain within the inlet a screening medium 106. A grate 108' covers the inner end of the inlet. This assembly is connected at 109, into the bearing member 110, to hold this member against the inside wall 105' of the packer 105 for transverse movement therewith.

The tube 111 has a ball 112 at its upper end to bear in the mandrel socket 113, and the fitting 114 surrounds the tube and is connected into the mandrel at 115 to complete the ball-and-socket joint. At its lower end the tube 111 also has the ball 116 which fits into the socket 117 in the bearing member 110. The passage 118 extends through the tube 111, including the balls, and places the mandrel passageway 81 in communication with the bore 119 of the screen assembly. For purposes to be hereinafter described, a fabric stocking 120 extends around the fitting 114, tube 111, and bearing member 110, terminating upwardly at the mandrel 25 and downwardly at the inside of the packer wall.

Should it be desired to determine the productivity of a formation at any level in an uncased well, the tool is first assembled, the mandrel assembly 30 being inserted against the pressure of spring 39 until the prong 62 latches in the catch 41, after which the stop collar 4 is installed. The tool is then installed on the drill string 8 and lowered into the well to some desired point, as where an electric log has indicated a porous formation or sand 122.

After the tool 1 has been lowered on the drill string 8 to any desired position in the well bore 95, as adjacent a formation 122 to be tested for productivity, the sampling tube 125 is lowered by the wire line 123 until the lower end thereof seats upon the seat 71.

As shown in Figs. 2 and 2-A, this sampling tube 125 has an upper housing 126 and a lower housing 127 slidable therein. The coupling member 128, between the upper section 129 and the lower section 130 of the upper housing 126, has the upper end of the spring 131 engaged therewith while the lower end of the spring is engaged with the coupling 132 between the upper section 133 and lower section 134 of the lower housing 127. The lower housing terminates downwardly in the closure plug 135 through which extends the pipe 136 to upstand thereabove within the lower section 134. This pipe 136 has the flange 137 at the bottom thereof to confine the packing elements 138 between the flange 137 and closure plug 135.

The port 151 is located in the pipe 142 to be moved above and below the gland 145, as will be hereinbelow explained. The packer 139 is held upon the periphery of the lower section 134 by means of the rings 140 and 141. The pipe 142 upstands from the coupling 132, through the spring 131, and coupling 128, including the packing 143, ring 144, and the gland 145 therein, and terminates upwardly in the top closure 146. This top closure 146 has the port 147 therethrough and the seal 148 therearound, so that the upper end of the pipe 142, including its top closure 146, is slidable within the recoil cylinder 149, which is located co-axially of the upper housing 126, by means of the radial spacers 150 connected to the cylinder. It also results that this construction operates as a balanced valve mechanism to prevent the movement of the port 151 into communication with the upper sample tube housing when external pressure operates to accomplish this result.

As shown in Fig. 4, the wire line 123, by means of which the sampling tube 125 has been lowered, extends through the stuffing box 152 of the cap 153, which is threaded at 154 over the top of the drill string 8. The slips 155, which fit in the rotary table 156, are shown holding the drill string 8 against vertical movement. The slips 155 and rotary table 156 are both diagrammatically indicated and the element 157 diagrammatically indicates the base or support at the top of the well within which the rotary table rotates and is supported. When the sampling tube 125 has been seated, the gland 158 is threaded into the stuffing box 152 to force the ring 159 downwardly to compress and tighten the packing 160 about the wire line 123.

When the gland 158 has been tightened, fluid under pressure is supplied to the drill pipe through the inlet 161 to force downwardly the drilling mud which has previously been supplied thereto. This mud is separated by the valve 76, shown in Fig. 2-A, from the tool parts therebelow, so is forced outwardly through the ports 52 shown in Fig. 1, into the annulus 89, and thence through the ports 88 into the closure bore 23, and thence through the passage 82 into the space 83 to bear against the inner periphery of the packer 105 to expand the packer outwardly against the formation 122. The relief valve 162 is provided to relieve against the injurious effects of excessive pressure exerted from above.

After the packer has been expanded, the gland 158 at the top of the well, as shown in Fig. 4, is loosened to relieve the tension in the wire line 123 so that the upper housing 126 of the sampling tube 125 can move downwardly from the position shown in Fig. 2 to position the port 151 above the gland 145. Fluid, as oil from the formation 122, may then flow through the screening member and fluid inlet assembly into the bore 119 of the bearing member 110. Then, with the tube 111 in the position shown in Fig. 2-A to accommodate packer expansion, the fluid flows up the passage 118 and thence through the mandrel passage 81 and tubular element 78 to the passage 77 to lift the valve 76.

The fluid then passes into the sampling tube pipe 136 and thereabove into the pipe 142 and out therefrom through the port 151 into the upper portion of the sampling tube. Then, when an upward pull is exerted on the wire line 123 from the top of the well, the upper housing 126 moves upward therewith to close off communication between the ports 128 and the upper part of the sampling tube in which the sample of fluid has been trapped and until the lower extension 150' of the spacer 150 is contacted by the coupling 128 as shown in Fig. 2. The sampling tube 125 may then be brought to the surface by means of drawing up the wire line by suitable hoisting equipment at the top of the well.

It is possible to circulate drilling fluid through the tool when it is in the collapsed position, as shown in Figs. 1 and 1-A, as the drilling fluid or mud can pass down the drill pipe 8 down into the tool and outwardly through the port 69 into the annulus 91, and thence through ports 92 into the space 86. From thence it can flow through the passage 84 into the space 87 and out therefrom through the post 121 into the well bore space 94. The valve 76 remains closed under force of fluid head thereabove while this circulation takes place.

When the sampling tube 125 is lowered into the tool 1 and seated at 71, as shown in Fig. 2-A, the cup type packer 139, shown in Fig. 2, seals off the mud from passing down the tube 65, and the packing 71', which comprises the seating element of the sampling tube, prevents the mud from flowing thereby and up into the sampling tube.

Figure 3:
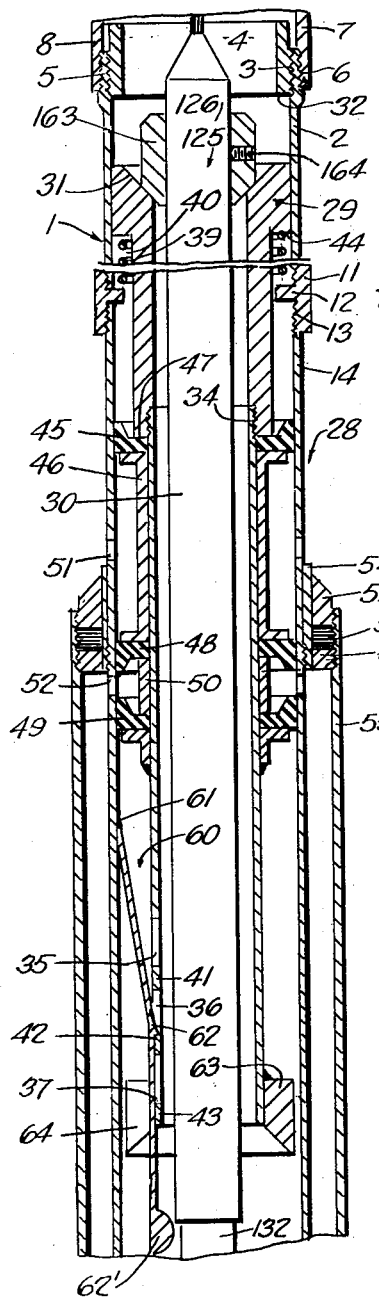
Fig. 3 is a sectional elevation of the upper end of the tool showing a collar on the upper end of the sampling tube seated within the tool to establish a valving arrangement permitting successive samples to be taken.

In cases where it may be desired to take several successive samples, as shown in Fig. 3, the beveled collar 163 is fixed on the sampling tube upper housing 126 by means of the set screw 164. In this case the beveled collar 163 seats at 31 in the mandrel assembly 30 to compress the spring 39 until the prong or trigger wedge 62 latches at catch 42. This places the ports 52 in communication with the space between the cup type packers or valves 48 and 49.

The cup type packer 49 will let fluid circulate thereby downwardly but not upwardly while the packer 48 will allow fluid to circulate upwardly but not downwardly. Because of this construction it is possible to force fluid past packer 48 and out through port 52 to expand the packer 105 and leave it expanded while successive samples are taken, as the fluid or mud in the packer can not flow back past packer 48 to relieve the pressure in the packer.

Figure 7:
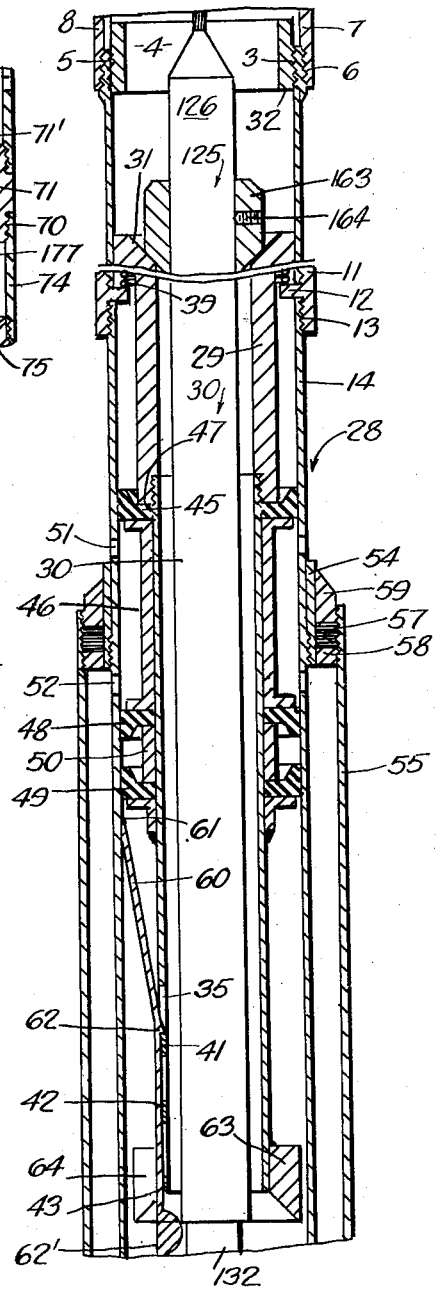
Fig. 7 is a sectional elevation of the upper end of the tool, showing a collar on the upper end of the sampling tube to establish a valving arrangement equalizing pressure within, and external to, the packer.

As shown in Fig. 7, it is possible to employ the sampling tube 125 to collapse the packer 105 by locating the collar 163 at a lower position on the sampling tube housing than shown in Fig. 3. This permits the spring 39 to be compressed a further distance before the collar 163 contacts the seat 31 and positions the catch 43 to be engaged by the trigger wedge 62. In this position the cup packers 48 and 49 are both below the ports 51 and 52 so that pressures within and outside the packer 105 are equalized since fluid may flow in the annular space 40 around the spool 46 and between the ports 51 and 52.

Figure 8:
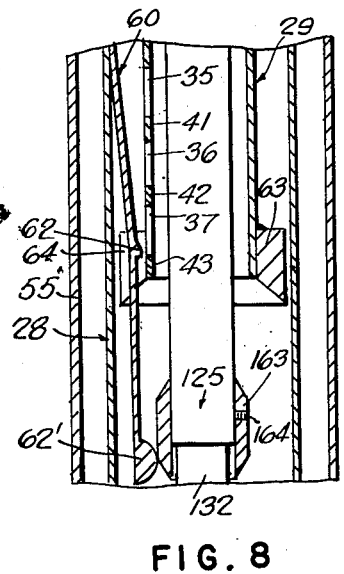
Fig. 8 is an enlarged sectional fragmentary view showing a portion of the tool with a collar installed on the sampling tube to produce lateral movement of the latching mechanism to trip the trigger.

It is also possible to employ the sampling tube 125 to move the trigger 62' laterally to unlatch the mandrel assembly 30 for upward movement so that it may return to the position shown in Fig. 1, or in cases, to positions determined by the collar 163, as shown in Figs. 3 or 7. This is accomplished, as shown in Fig. 8, by installing the collar 163 on the lower end of the upper sampling tube housing 126 so that it contacts the trigger 62' to move the latching device 60 laterally outward thereby permitting the spring 39 to return the mandrel 30 to upward position.

It is possible to provide a sampling tube 125 with the pipe 136 extended to such a length that the volume of the annulus 165 therearound is greater than the volume of interior space extending from right below the top of the pipe 136 to the fluid inlet 108. In this way, the drilling mud which has expanded the packer 105 will be forced up into this annulus 165 ahead of the connate fluid produced from the formation 122 so that the connate fluid may later pass upwardly thereabove.

If the annular space 165 is filled with water before each run of the sampling tube 125, any mud initially present in the interior space from the top of the pipe 136 and the fluid inlet 108 will be trapped or substantially diluted thereby, thus minimizing the possibility of the mud clogging the port 151 or the passages leading into the upper portion of the sampling tube.

The port 121 in the plug 26 and the port 93 in the mandrel 25 are together provided to equalize the pressures in the well bore 94 above and below the expanded packer. This insures against the bursting, failure, or collapse of the packer 105, as may otherwise occur, as when a slow infiltration of water from the mud enters the permeable formations below the level at which the packer is expanded.

Figure 5:
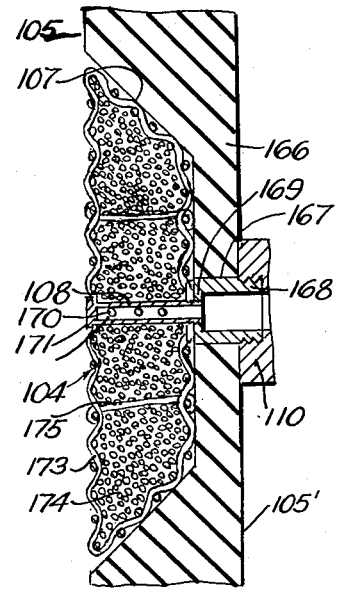
Fig. 5 is an enlarged sectional elevation showing details of the screening member construction.

An enlarged detail of a satisfactory screening member and fluid inlet assembly 104 is shown in Fig. 5. The recess 107 is provided in the packer wall, thereby leaving the wall portion thinner at 166. A hole 167 is provided through this thin wall portion 166 and the connector 168 is inserted therethrough for threaded engagement inwardly with the bearing member 110. Outwardly of the connector, the fluid inlet tube 108 is provided and threaded into the outer end 169 of the connector. The inlet tube 108 has the perforations 170 therein and the flange 171 at the outer end thereof to bear against the mesh wire screen 173 which encloses the screening substance 174, as gravel. The reinforcing wires 175 extend between the mesh wires.

An optional construction, as shown most clearly in Fig. 2-A, shows the inlet tube 108 of substantially larger diameter, and surrounded by the reinforced rubber pad 109 which fits into the recess 107 but which is not connected to the packer 105. The mesh screen 173 covers the outer end of the inlet and is tacked to the flange 171 to retain the gravel 174 inside the inlet. This inlet has the perforated disc 176 in the inner portion of its bore to confine the gravel.

Figure 6:
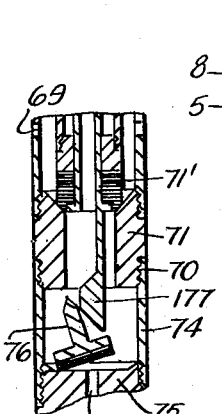
Fig. 6 is a fragmentary sectional elevation, in enlarged detail, showing a modified form of the lower end of the sampling tube shown in Fig. 2–A, equipped to unseat the valve thereinbelow to permit washing of the screening member.

When it becomes necessary to wash the screening member 104', as when the gravel may become clogged, an attachment 177, as shown in Fig. 6, may be extended below the flange 137 at the lower end of the sampling tube 125. When the sampling tube 125 is then lowered into seated position on the seat 71, this attachment 177 extends therebelow to unseat the valve 76. Then a fluid may be forced from the sampling tube 125, or from any other suitable container above the valve 76, to wash downwardly and clear the screen.

Numerous experimental tests indicate that an effective screening member 104' is necessary to prevent the clogging of fluid inlet 108 with sand or other formation eroded from producing formation 122 by fluid flow. Such formation erosion may also result in the formation of a cavity around inlet 108 which may become sufficiently large to result in failure of packer 105. Effective screening at this point is therefore critical from the standpoint of a testing device sufficiently positive in operation as to render unnecessary usual testing and coring operations. While several types of screening procedures are operative for this purpose, it has been determined by experimental investigation that the use of a fine gravel 174 held in place by appropriate screen members 173, 175 is preferable to other types of screen. It is necessary that the construction be sufficiently pliant and of such nature as to result in pressing the screen member directly against the wall of the well when the packer 105 is expanded.

Numerous tests indicate that in case of unconsolidated sands even a very small space between the screen member 104' and the face of the sand 122 results in a mixture of sand and mud filter cake which clogs the screen; whereas, if the inlet is pressed directly against the wall so as to support the sand, thus preventing mixing of sand and mud filter cake, clogging does not occur.

In case of gravel screens it has been found that the use of gravel having an average grain size approximately six times that of the coarsest 10 per cent of the sand to be screened effectively prevents the inflow of sand into inlet 108 while permitting the passage of the mud filter cake which is usually present on the face of the sand. Such also permits flow of any connate fluid yielded by the formation against which the screening member is pressed. The use of gravel pads contained in flexible screen wire containers, such as shown in Fig. 5, also permits the testing of a relatively large side wall area without material sacrifice of expansibility of the packer or of its ability to conform to an irregular wall surface.

Fluid entering inlet 108 flows through bore 119, fluid passage 118, pipe 78, and into sampling tube 125 (Fig. 2).

The loosely fitting impermeable fabric covering 120 surrounds the bearing member 110 and tube 111 to positively prevent leakage into tube 111 and the ball and socket joints when the external pressure exceeds that inside tube 111. This is necessary since the hydrostatic head, due to the fluid column in the well, will be at least equal to and usually exceeds that of formations comprising the wall of the well. Thus leakage will tend to occur from inside packer 105 into pipe 111 rather than in the reverse direction.

Throughout the specification the term "tool" has been employed to designate the body of the invention but it is herein pointed out that the term "device" is equally applicable to describe the over-all assembly; likewise whereas the element 105 has been termed a "packer" but it may as well be termed a "packing element" or a "packing sleeve of expansible material"; likewise the term "support" may be employed as well as the term "device" to describe the "tool" or "tool assembly." Also the "sampling tube" may be termed the "sample receiver" or "sample receiving container"; the term "conduit" may be employed wherever the terms "passage" or "passageway" have been used; and the terms "valve mechanism" or "valve means" may optionally be used in place of the term "valve" wherever this word occurs throughout the specification. Additionally the "gravel" in the strainer may also be termed a "granular material."

Broadly this invention covers a structure for determining the productivity of an oil producing formation at any desired level in an uncased well bore.

This invention also considers a structure for taking a succession of samples of fluid at a desired level in an uncased well bore without resetting the packer after taking each sample.

This invention also considers testing the productivity of a well by a structure which employs the sampling tube thereof to change the valving condition in the testing tool to alter pressure conditions at the level thereof.

I claim:

1. Apparatus for obtaining samples of the fluid content of the earth formations traversed by a well bore, said apparatus comprising, a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to receive connate fluid from the formation under formation pressure while excluding formation particles and a rigid, tubular connection between said strainer and said housing within said packer and pivotally connected at one end to said strainer and at the other end to said housing, channel means in said housing to complete a flow passage between said tubular connection and said sample containing means whereby said connate fluid may flow via said strainer, said connection and said channel means to said sample containing means.

2. Apparatus for obtaining samples of the fluid content of the earth formations traversed by a well bore, said apparatus comprising, a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to receive connate fluid from the formation under formation pressure while excluding formation particles, a rigid, tubular connection between said strainer and said housing within said packer and pivotally connected at one end to said strainer and at the other end to said housing, channel means in said housing to complete a flow passage between said tubular connection and said sample containing means whereby said connate fluid may flow via said strainer, said connection, and said channel means to said sample containing means, said apparatus including means for bringing said sample containing means to the surface of the well.

3. Apparatus for obtaining samples of the fluid content of the earth formations traversed by a well bore, said apparatus comprising, a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to receive connate fluid from the formation under formation pressure while excluding formation particles, a rigid, tubular connection between said strainer and said housing within said packer and pivotally connected at one end to said strainer and at the other end to said housing, channel means in said housing to complete a flow passage between said tubular connection and said sample containing means whereby said connate fluid may flow via said strainer, said connection, and said channel means to said sample containing means, and a pressure equalization passage in said housing to provide fluid communication between said well bore sections above and below said packer.

4. Apparatus for obtaining samples of the fluid content of the earth formations traversed by a well bore, said apparatus comprising, a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to receive connate fluid from the formation under formation pressure while excluding formation particles, said housing including a body, and a mandrel slidable therein, a rigid, tubular connection between said strainer and said body within said packer and pivotally connected at one end to said strainer and at the other end to said body, channel means in said body to complete a flow passage between said tubular connection and said sample containing means whereby said connate fluid may flow via said strainer, said connection and said channel means to said sample containing means, said mandrel and said body together providing an integrated flow passage therethrough and valve means operable to open and close said flow passage so that a fluid may be circulated from the top of the well bore through said integrated flow passage and out of said apparatus into the well bore therebelow.

5. Apparatus for obtaining samples of the fluid content of the earth formations traversed by a well bore, said apparatus comprising, a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to receive connate fluid from the formation under formation pressure while excluding formation particles, said packer having a recess therein, said strainer including a screening material encased in a mesh and yieldably fitting in said recess, and means completing a flow passage between said strainer and said sample containing means.

6. Apparatus for obtaining samples of the fluid content of the earth formations traversed by a well bore, comprising a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to contact the formation when said packer is inflated, a tubular connection between said strainer and the inner wall of said packer, a socket in said connection, a socket in said housing, a rigid tubular element having ball members at either end to establish a universally connected flow passage means between said connection socket and said housing socket, and means providing a fluid channel between said housing socket and said sample containing means.

7. Apparatus for obtaining samples of the fluid content of the earth formations traversed by a well bore, said apparatus comprising, a housing adapted to be lowered to predetermined positions in the well bore adjacent formations to be sampled, a sample containing means in said housing, an inflatable packer on said housing, means for inflating said packer to seal off the well bore, a strainer in the wall of said packer providing a yieldable strainer portion to receive connate fluid from the formation under formation pressure while excluding formation particles, said packer having a recess therein, said strainer including a flexible pad fitting in said recess, a rigid inner member extending through said pad, a mesh on the outer side of said rigid member and a grate on the inner side thereof and a screening material confined thereinbetween, and means completing a flow passage between said strainer and said sample containing means.

THOMAS SCOTT WEST.

REFERENCES CITED

The following references are of record in the file of this patent:

UNITED STATES PATENTS

| Number | Name | Date |
|---|---|---|
| 828,956 | McEvoy | Aug. 21, 1906 |
| 2,229,635 | Boynton | Jan. 28, 1941 |
| 2,391,609 | Wright | Dec. 25, 1945 |
| 2,404,825 | Brown et al. | July 30, 1946 |
| 2,441,894 | Mennecier | May 18, 1948 |